United States Patent
Funayama

(10) Patent No.: US 7,188,239 B2
(45) Date of Patent: Mar. 6, 2007

(54) APPARATUS WITH A STANDBY MODE, PROGRAM AND CONTROL METHOD FOR AN APPARATUS WITH A STANDBY MODE

(75) Inventor: Osamu Funayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 391 days.

(21) Appl. No.: 10/714,604

(22) Filed: Nov. 18, 2003

(65) Prior Publication Data

US 2004/0098578 A1 May 20, 2004

Related U.S. Application Data

(63) Continuation of application No. PCT/JP01/04168, filed on May 18, 2001.

(51) Int. Cl.
G06F 9/00 (2006.01)
G06F 15/177 (2006.01)

(52) U.S. Cl. .............................. 713/2; 713/1; 713/323
(58) Field of Classification Search ..................... None
See application file for complete search history.

(56) References Cited

U.S. PATENT DOCUMENTS 5,974,552 A * 10/1999 Lim et al. ................... 713/300
5,978,913 A * 11/1999 Broyles et al. ................. 713/2
6,434,696 B1 * 8/2002 Kang ............................ 713/2
6,691,068 B1 * 2/2004 Freed et al. ................. 702/187
6,732,280 B1 * 5/2004 Cheok et al. ............... 713/300
6,795,912 B1 * 9/2004 Itoh et al. ....................... 713/2
6,813,674 B1 * 11/2004 Velasco et al. ............. 710/311

FOREIGN PATENT DOCUMENTS

JP 3-265027 11/1991
JP 2000-207814 7/2000

* cited by examiner

Primary Examiner—Rehana Perveen
Assistant Examiner—Anand B. Patel
(74) Attorney, Agent, or Firm—Staas & Halsey LLP

(57) ABSTRACT

When a personal computer system user carries out an OS shutdown, a BIOS does not turn off power, but reboots the system by a software reset to execute a POST, so that the state of the system immediately before starting the launch of the OS after completion of the POST is held in a volatile memory, and the system is shifted to a power saving mode. Subsequently, when the system is booted, the BIOS performs only restoration processing from the power saving mode while omitting the POST execution, and at once launches the OS, thereby shortening the system boot time by omitting the POST execution when the system is booted. Thus, POST processes are performed after the OS shutdown, a state that the POST has been completed after rebooting is held in the volatile memory, and then the system is placed into a state of power saving mode.

11 Claims, 4 Drawing Sheets

Fig. 3

EXAMPLE OF BIOS SETTING ITEMS FOR SELECTING WHETHER BOOTING WITHOUT POST IS EXECUTED

| BIOS SETUP UTILITY | |
|---|---|
| MAIN MENU   DETAILS   SYSTEM SECURITY   POWER MANAGEMENT | BOOT OPTIONS   INFORMATION   EXIT |
| POST UPON BOOTING :    [SKIP]<br>SELF-DIAGNOSTIC SCREEN UPON BOOTING :   [NOT DISPLAYED]<br><br>>BOOT SEQUENCE | ITEM HELP |
| | SET WHETHER POST IS EXECUTED UPON BOOTING.<br><br>[SKIP]<br>EXECUTE POST UPON EXIT TO ENTER POWER MANAGEMENT MODE, AND DO NOT EXECUTE POST UPON BOOTING.<br><br>[SKIP]<br>EXECUTE POST UPON BOOTING. |

Fig. 4

EXAMPLE OF OS SETTING SCREEN FOR SELECTING WHETHER BOOTING WITHOUT POST IS EXECUTED

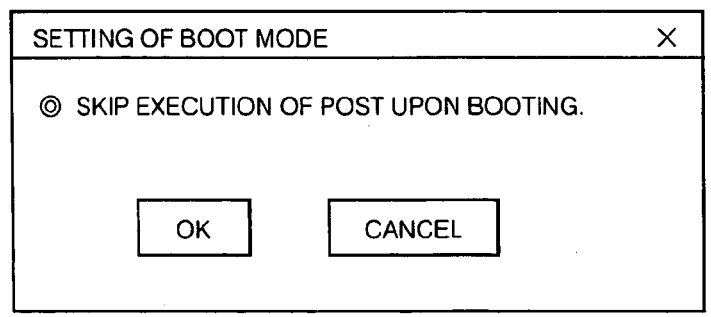

EXAMPLE OF OPERATION SCREEN UPON SHUTDOWN OF OS IN WHICH BOOTING WITHOUT POST CAN BE SELECTED

EXAMPLE OF KNOWN BOOT PROCESS FLOW FROM SHUTDOWN OF OS

APPARATUS WITH A STANDBY MODE, PROGRAM AND CONTROL METHOD FOR AN APPARATUS WITH A STANDBY MODE

This application is a continuing application, filed under 35 U.S.C. §111(a), of International Application PCT/JP01/04168, filed May 18, 2001.

TECHNICAL FIELD

The present invention relates to an apparatus with a standby mode, such as a personal computer apparatus, etc., configured to perform initialization processing at the time of booting, as well as a program and a control method for such an apparatus with a standby mode, and more particularly, it relates to an apparatus with a standby mode, as well as a program and a control method for such an apparatus having a standby mode, in which when an apparatus is brought into a non-working or inactive state in the shutdown processing of an OS (Operating System), it is restarted or rebooted instead of being powered off, and after an initialization processing (hereinafter referred to as POST (Power On Self Test)), which is to be carried out during a startup of the apparatus, has been executed beforehand by a BIOS (Basic Input/Output System), the apparatus is shifted to a power management or saving mode in which it is in a stand-by state. Thus, when the apparatus is brought into a working condition, only restoration processing from the power saving mode is performed at once to boot the OS while omitting or skipping the execution of the POST, whereby the boot time of the apparatus is shortened.

BACKGROUND ART

FIG. 6 is a flow chart showing one example of boot processing from a shutdown of an OS in a conventional personal computer system or apparatus. First of all, when the shutdown or termination of the OS is carried out (S61), a BIOS performs shutdown processing necessary for respective devices (S62) and then turns off the power of the personal computer system or apparatus (S63). Subsequently, when a user powers on to start the system (S64), the BIOS executes a POST (S65), and after completion of the POST, the OS is booted or launched (S66).

Thus, when the personal computer system is booted from a power-off state, it is necessary for the BIOS to execute the POST for diagnosis to verify that the system is operating normally as well as for initialization of connected peripheral equipment. Accordingly, when the personal computer system is caused to shift from a non-working or inactive condition to a working or active condition, the time from power on until the POST terminates is indispensable.

However, the time required to execute the POST tends to become longer because of an increase in the peripheral equipment connected with the system, an increase in the functions that the BIOS supports, etc. Therefore, various technologies for simplifying the POST to speed up booting by omitting initialization processing, shortening code optimization processing, etc., have hitherto been proposed to reduce the time required to execute the POST.

On the other hand, there has been proposed a technique to reduce the time required from a paused or sleep state until the system restores to an available or enabled state, by using a power management or saving mode (Standby, Hibernate, etc.) that is a stand-by state, instead of powering off the system.

However, there are limits on the simplification and the speed-up of the POST processing. On the other hand, the peripheral equipment connected with the personal computer system and the functions supported by the BIOS ever increase more and more, so it is becoming difficult to achieve enough effects to shorten the time required for the POST processing.

On the other hand, a standby (Standby), in which the system shifts to a power management mode while holding the state of the system during the operation of the OS in a volatile memory, requires a short time until the system restores to an available state, but the system might be subject to the danger that the data held by the memory might be lost if the main power supply is cut off or the battery runs short during the standby. Therefore, when the system is brought into a non-working condition, there is a demand that the operation of the system should be terminated and placed into the non-working state, instead of being brought into a standby state.

In addition, in a hibernation (Hibernation) or hibernate (Hibernate), in which the state of the system under operation of the OS is preserved or saved to a hard disk that is a nonvolatile recording medium and then the operation of the system is terminated, there is little danger of loss of the data. However, in order for the system to restore to a usable state, execution of the POST is needed prior to the use of the system, so the time needed for restoration is not significantly reduced in comparison with the case where the system is booted from power off, thus leaving the problem unimproved that it takes time to restore the system from a non-working state to a working state.

Accordingly, the present invention is intended to provide an apparatus with a standby mode, such as a personal computer system, etc., and a BIOS and an OS therefor, as well as a boot method for an apparatus with a standby mode, in which the apparatus can be rapidly or quickly shifted from a non-working condition to a working condition thereby to shorten a waiting time in a remarkable manner by omitting initialization (POST) processing to be executed upon shifting from the non-working condition to the working condition.

DISCLOSURE OF THE INVENTION

In order to solve the above-mentioned difficulties, the present invention provides an apparatus with a standby mode, said apparatus comprising: an initialization part for performing initialization processing of at least a part of said apparatus; a standby mode shifting part for shifting said apparatus to the standby mode while maintaining the state of said apparatus initialized by said initialization part; and a restoration part for restoring said apparatus from the standby mode according to said standby mode shifting part with said initialized state being maintained. Here, note that the apparatus with a standby mode can include not only a so-called computer system including a personal computer system but also all apparatuses with a standby mode having a CPU installed thereon, such as measuring instruments, analyzers, various control devices, and so on. In addition, said initialization part can be comprised of a BIOS, and said initialization processing can be comprised a POST.

Moreover, the present invention is characterized in an apparatus with a standby mode, comprising: a boot part for performing boot processing of said apparatus by a power supply being turned on; and a selection part capable of selectively setting whether the initialization processing according to said initialization part is made when said apparatus is shifted to the standby mode by said standby mode shifting part, or before or at the time when the boot processing is performed by said power supply being turning on. Here, it can be characterized in that said initialization part and said selection part is comprised of a BIOS, and said initialization processing is comprised of a POST. Further, the apparatus with a standby mode according to the present invention can be characterized in that said initialization part is comprised of a BIOS, and said initialization processing is comprised of a POST, and said selection part is comprised of an OS.

Moreover, the apparatus with a standby mode according to the present invention is characterized in that the selective setting according to said selection part is performed at the time of shutdown processing of an OS, and said initialization part performs the initialization processing upon receipt of an instruction for placing said apparatus into a non-working condition.

Further, a program according to the present invention serves to operate a computer system with a standby mode, said program making said computer system function as: an initialization part for performing initialization processing of said computer system; a standby mode shifting part for shifting said computer system to the standby mode while maintaining said initialized state of said computer system; and a restoration part for restoring said computer system from said standby mode with said initialized state thereof being maintained. Furthermore, the program according to the present invention further functions as a selection part for selectively setting one of a first mode in which said initialization processing is performed before said computer system is shifted to said standby mode, and a second mode in which said initialization processing is performed at the time when said computer system is powered on. Here, said program can be comprised of a BIOS, and said initialization processing can be comprised of a POST. Also, it is characterized in that said initialization processing and the shifting of said computer system to said standby mode are performed based on a specified shutdown form of an OS.

Moreover, a program of the present invention serves to operate a computer system with a standby mode, said program making said computer system function as: an operating part for operating said computer system; and a selection part for selectively setting one of a first mode and a second mode, said first mode being such that another program is given an instruction for shifting said computer system to a stand-by state while performing initialization processing of said computer system at the time of shutdown processing of said operating part, said second mode being such that said initialization processing is performed before said operating part is booted. Here, said instruction for shifting said computer system to a non-working condition can be comprised of a selection of said first mode.

In addition, a method for controlling an apparatus with a standby mode according to the present invention comprises: a step of performing initialization processing of said apparatus; a step of shifting said apparatus to the standby mode while maintaining the initialized state thereof; and a step of restoring said apparatus from said standby mode in response to receipt of an instruction for placing said apparatus into a working condition. Moreover, the method for controlling an apparatus with a standby mode is characterized by further comprising: a step of rebooting said apparatus in response to receipt of an instruction for placing said apparatus into a non-working condition, wherein said initialization step is performed after said reboot step.

With the basic configuration as shown in an embodiment of the present invention, when the shutdown operation of an OS is carried out by a user of a personal computer system, a BIOS does not turn off the power supply at once but reboots the system by a software reset to execute a POST, so that the state of the system immediately before the boot or launch of the OS is started after completion of the POST is held in a volatile memory, and the system is shifted to a standby mode that is a power saving mode (standby).

Subsequently, when the system is booted, the BIOS performs only restoration processing from the power saving mode while omitting or skipping the execution of the POST, and starts the launch of the OS at once.

With the above configuration, the boot time of the system can be shortened by omitting or skipping the execution of the POST when the system is booted. The processes required by the POST are performed after the shutdown processing of the OS, and the state of the system at the time when the POST is completed after rebooting is held in a volatile memory, and the system is placed into a state in which it is in the power saving mode.

In this state, if the main power supply is cut off or the battery runs short, the system is placed into a power-off state, but the OS has already been shutdown and hence there is no danger of data loss unlike the case where the system is shifted to the standby during operation of an OS used in the prior art.

Furthermore, by providing a scheme of selecting whether the POST is ordinarily done at the time of booting (second mode) or whether the system is booted while skipping the POST (first mode), it is possible to ordinarily power off the system after the OS has been shutdown. This can be used in a case where the user changes the equipment connected with the system or where power is turned off because of the non-use of the system for a long time, or other like cases.

BRIEF DESCRIPTION OF THE DRAWINGS

FIG. 3 is a view showing one example of a BIOS setting screen for selecting whether the system is booted up while skipping a POST.

FIG. 4 is a view showing one example of an OS setting screen for selecting whether booting is done while skipping the POST.

BEST MODE FOR CARRYING OUT THE INVENTION

In the following, a preferred embodiment of the present invention will be described while referring to the accompanying drawings.

Figure 1:
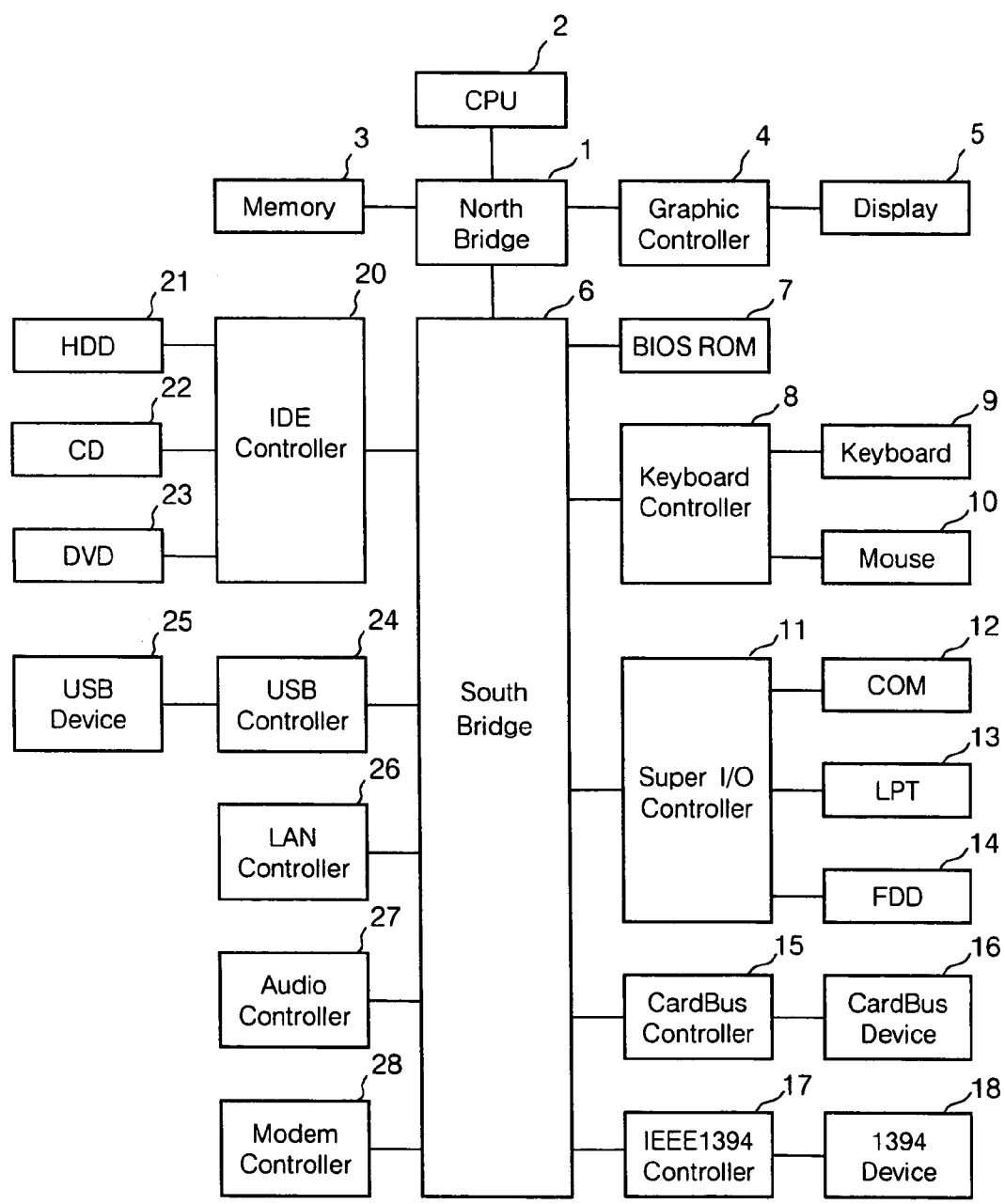
FIG. 1 is a block diagram showing an example of the configuration of a personal computer system according to one embodiment of the present invention.

FIG. 1 is a block diagram that shows the configuration of an apparatus with a standby mode in the form of a personal computer system according to an embodiment of the present invention.

The personal computer system 100 shown in FIG. 1 includes: a north bridge 1; a CPU2, a memory 3 and a graphic controller 4 all connected to the north bridge 1; and a display 5 connected to the graphic controller 4.

Also, the personal computer system 100 further includes: a south bridge 6 connected to the north bridge 1; a BIOS ROM 7 connected to the south bridge 6 and having a BIOS stored therein; a keyboard controller 8 connected to the south bridge 6 with a keyboard 9 and a mouse 10 both connected to the keyboard controller 8; an 10 controller 11 with a COM (communication port) 12 and an LPT (printer port) 13 and a FDD 14 all connected to the IO controller 11; a CardBus controller 15 with a CardBus device 16 connected to the CardBus controller 15; and an IEEE 1394 controller 17 with a 1394 device 18 connected to the IEEE 1394 controller 17.

In addition, the personal computer system 100 further includes an IDE controller 20 connected to the south bridge 6 with a HDD 21, a CD 22 and a DVD 23 being all connected to the IDE controller 20; a USB controller 24 with a USB device 25 connected to the USB controller 24; a LAN controller 26; an audio controller 27; and a modem controller 28.

In the above-mentioned configuration, initialization processing (POST) is performed by the BIOS stored in the BIOS ROM 7 so that the contents or data of the memory, the various controllers, registers of the various devices connected thereto, and the like are properly initialized. After such initialization, an OS stored in the HDD is launched or booted. In a preferred form of the present invention, it is configured in such a manner that when the personal computer system 100 is shifted from a working condition to a non-working condition, the demand of the user, who wishes to boot the personal computer system 100 quickly, can be satisfied by selectively setting one of a first mode and a second mode properly as desired, the first mode being such that after initialization processing has been carried out, the system is shifted to a power management or saving mode in which it is kept in a stand-by state, whereafter when the system is again placed into the working condition, the OS is booted or launched at once while omitting or skipping initialization processing, and the second mode being such that the power supply is brought into a turned-off state to shift the system to the non-working condition without performing initialization processing, as in the prior art, and thereafter when the system is shifted to the working condition, power is turned on to perform initialization processing, after which the OS is booted or launched.

In the following, the operation of this embodiment will be concretely described.

Figure 2:
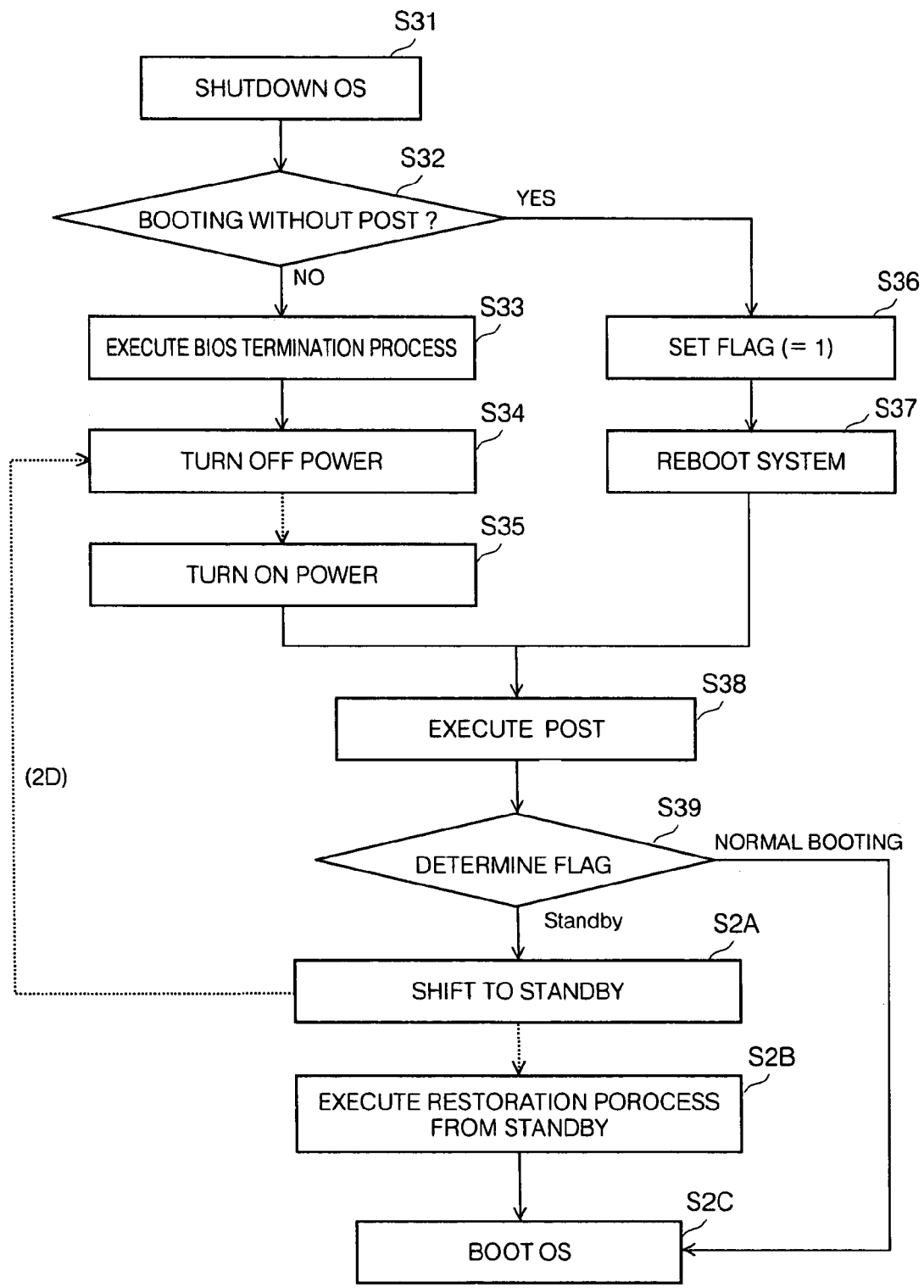
FIG. 2 is a flow chart showing the operation of the embodiment of the present invention.

FIG. 2 is a flow chart that shows the processes from the time when the personal computer system is placed into a non-working condition until it is again placed into a working condition.

When a shutdown of the OS is performed (S31), it is determined whether a first mode of booting the system while skipping the POST is selected (S32), and when the first mode is not selected (S32, NO), power-off processing is performed (S34) after the shutdown processing of the BIOS (S33). When the first mode of booting the system while skipping the POST is selected (S32, YES), the BIOS sets a flag for performing the operation of shifting the system to a standby mode (Standby) after the POST has been completed (S36), and reboots the system by software reset (S37). The flag used in step S36 is recorded in a storage area of a nonvolatile memory or the like that is not cleared by software reset. Following the reboot (S37), the BIOS executes the POST (S38). Upon completion of the POST, a flag determination is carried out as to whether the operation of shifting the system to a standby is performed (S39). In this processing, only when the POST has been executed after the system reboot (S37) and the flag has been set, the system is shifted to a standby (S2A), whereas when the POST has been executed after power-on (S35) or when the flag is cleared, a determination to perform a normal or ordinary boot is made. In this connection, it is to be noted that if the processing of clearing the flag upon completion of the determination is carried out here, it is possible to prevent the system from being shifted to standby by mistake after the POST has been completed.

When the shift to the standby mode is decided by the flag determination in step S39, the BIOS holds in a volatile memory the state of the personal computer system immediately before the boot of the OS is started after completion of the POST in step S38, and shifts the system to the standby mode.

Subsequently, when the user boots the system, the BIOS performs restoration processing from the standby, as shown in step S2B, and boots or launches the OS at once (S2C). Thus, the execution of the POST during booting can be skipped or omitted, thereby making it possible to shorten the time required to boot up the system.

Figure 6:
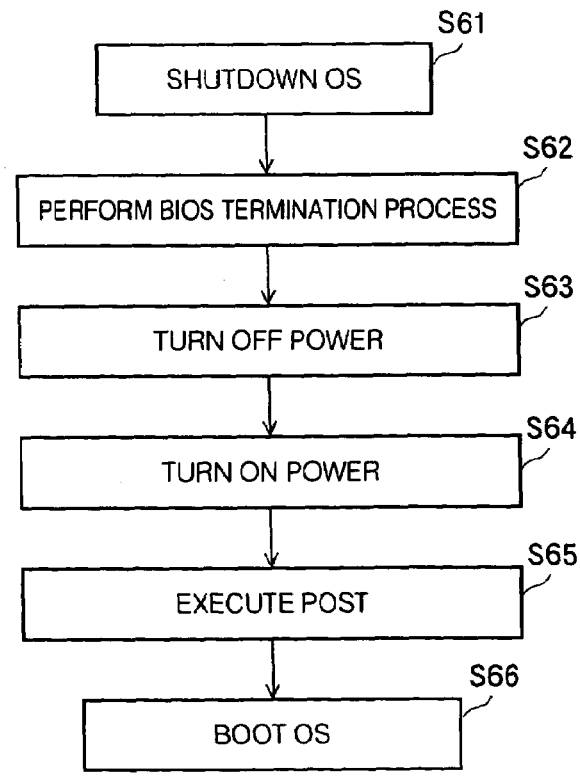
FIG. 6 is a flow chart showing one example of a conventional operation from the shutdown to the boot of an OS.

In contrast to this, in the case of a normal or ordinary boot, i.e., the second mode, when power is turned on to boot up the personal computer system at the reuse thereof, the POST is executed (S38) from power on (S35), and the OS is launched (S2C) after the flag determination (S39) has been made. The process flow in this case is the same as the conventional boot process flow shown in FIG. 6, excluding the flag determination indicated at step S39.

Here, note that when the main power supply is interrupted or when the battery runs off, the system is brought from the standby state in step S2A into a power-off state in step S34, as indicated at arrow 2D. In this case, however, normal or ordinary boot processing is carried out so that the POST is not skipped or omitted during the boot up of the system, enabling a normal boot to be performed.

FIG. 3 is a view showing an example of a setting screen by which the user can select, based on his or her desire, whether to boot up the system while omitting or skipping the POST in the BIOS operation. When an item "POST UPON BOOTING" is set to "SKIP" here, the first mode is set so that the execution of the POST is skipped or omitted upon boot up of the personal computer system, thereby shortening the boot time.

Additionally, it is preferred that the BIOS do not have setting items for this case, but when the OS receives an instruction for shutdown processing, the user be permitted to make a selection as to whether the BIOS should execute the POST as usual or skip it to boot up at the time of the next boot.

Moreover, FIG. 4 shows an example of a setting screen for selecting whether to boot up while skipping the POST in the OS. When "SKIP EXECUTION OF POST UPON BOOTING" is set here, the processing according to the present invention is executed so that the execution of the POST is skipped or omitted to shorten the boot time upon booting.

Figure 5:
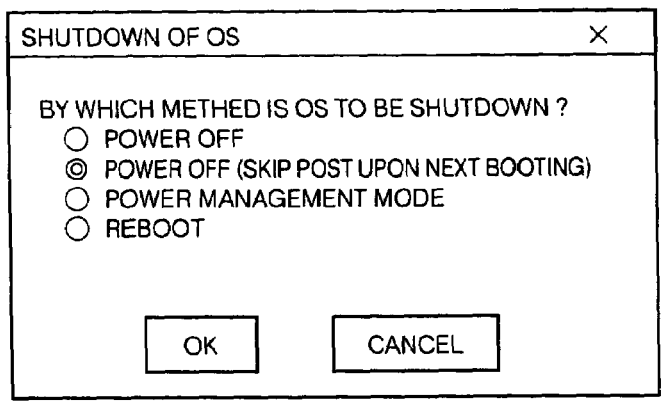
FIG. 5 shows an example of an operation screen at the time of shutdown of an OS for permitting a selection as to whether booting is done while skipping the POST.

Incidentally, as a further example in this case, such a selection may be made at the time of shutdown of the OS, and an example of an operation screen in this case is shown in FIG. 5. When "POWER OFF (SKIP POST UPON NEXT BOOTING))" is selected here, the processing according to the present invention is executed so that the execution of the POST is skipped or omitted to shorten the boot time upon booting.

Furthermore, although the configuration in the above-mentioned embodiment is such that the system is shifted to the standby in the state thereof immediately before the start of booting of the OS, it may be configured to control such that the OS is first booted and the system is then shifted to the standby.

With such a configuration, at the reuse of the system, not only the time taken to execute the POST but also the time taken to boot the OS and to make initial settings can be shortened.

INDUSTRIAL APPLICABILITY

As described in detail in the foregoing, according to the present invention, there is obtained an advantageous effect that a shift can be made rapidly or quickly from a non-working condition to a working condition thereby to shorten a waiting time in a remarkable manner by omitting the POST to be executed upon shifting from the non-working condition to the working condition.

The invention claimed is:

1. An apparatus with a standby mode, comprising:
   an initialization part performing initialization processing of at least a part of said apparatus;
   a standby mode shifting part shifting said apparatus to the standby mode while maintaining a state of said apparatus initialized by said initialization part;
   a restoration part restoring said apparatus from the standby mode, according to said standby mode shifting part with said initialized state being maintained;
   a boot part for performing boot processing of said apparatus by a power supply being turned on; and
   a selection part capable of selectively setting whether the initialization processing according to said initialization part is made when said apparatus is shifted to the standby mode by said standby mode shifting part, or before or at the time when the boot processing is performed by said power supply being turned on.

2. The apparatus with a standby mode as set forth in claim 1, wherein said initialization part comprises a BIOS, and said initialization processing comprises a POST.

3. The apparatus with a standby mode as set forth in claim 1, wherein said initialization part and said selection part comprise a BIOS, and said initialization processing comprises a POST.

4. The apparatus with a standby mode as set forth in claim 3, wherein the selective setting according to said selection part is performed at a time of shutdown processing of an OS.

5. The apparatus with a standby mode as set forth in claim 1, wherein said initialization part comprises a BIOS, and said initialization processing comprises a POST, and said selection part is part of an OS.

6. A computer readable recording medium storing at least one program for operating a computer system with a standby mode according to a process comprising:
   initializing said computer system upon receipt of an instruction to place the computer system into the standby mode;
   shifting said computer system to the standby mode while maintaining said initialized state of said computer system;
   restoring said computer system from said standby mode with said initialized state thereof being maintained; and
   selectively sets one of a first mode in which said initialization processing is performed before said computer system is shifted to said standby mode, and a second mode in which said initialization processing is performed at a time when said computer system is powered on.

7. The medium as set forth in claim 6, wherein said program comprises a BIOS, and said initialization processing comprises a POST.

8. The medium as set forth in claim 7, wherein said initialization processing and the shifting of said computer system to said standby mode are performed based on a specified shutdown of an OS.

9. A computer readable recording medium storing at least one program for operating a computer system according to a process comprising:
   operating said computer system; and
   selectively setting one of a first mode and a second mode, said first mode giving another program an instruction for shifting said computer system to a standby state while performing initialization processing of said computer system at a time of shutdown processing of said operating, said second mode initializing said computer system before booting for said operating of the computer system.

10. The medium as set forth in claim 9, wherein said instruction for shifting said computer system to the standby state comprises selection of said first mode.

11. A method for controlling an apparatus with a standby mode, comprising:
   rebooting said apparatus in response to receipt of an instruction for placing said apparatus into the standby condition,
   initializing said apparatus after said rebooting;
   shifting said apparatus to the standby mode while maintaining the initialized state thereof; and
   restoring said apparatus from said standby mode in response to receipt of an instruction for placing said apparatus into a working mode.

* * * * *